US010059629B2

(12) United States Patent
Actis-Datta et al.

(10) Patent No.: US 10,059,629 B2
(45) Date of Patent: Aug. 28, 2018

(54) PROCESS FOR THE PRODUCTION OF A ZIRCONIA-BASED, COLOURED, IN PARTICULAR GREY, ARTICLE AND A ZIRCONIA-BASED COLOURED DECORATIVE ARTICLE OBTAINED USING THIS PROCESS

(71) Applicant: Comadur S.A., Le Locle (CH)

(72) Inventors: Arnaud Actis-Datta, Sion (CH); Damien Cartier, Besancon (FR)

(73) Assignee: Comadur S.A., Le Locle (CH)

( * ) Notice: Subject to any disclaimer, the term of this patent is extended or adjusted under 35 U.S.C. 154(b) by 266 days.

(21) Appl. No.: 14/883,984

(22) Filed: Oct. 15, 2015

(65) Prior Publication Data

US 2016/0115082 A1 Apr. 28, 2016

(30) Foreign Application Priority Data

Oct. 22, 2014 (EP) .................................... 14189958

(51) Int. Cl.
C04B 35/48 (2006.01)
C04B 35/64 (2006.01)
C04B 35/626 (2006.01)
C04B 35/486 (2006.01)
C04B 35/634 (2006.01)
G04B 37/22 (2006.01)

(52) U.S. Cl.
CPC ............ *C04B 35/481* (2013.01); *C04B 35/48* (2013.01); *C04B 35/486* (2013.01); *C04B 35/62695* (2013.01); *C04B 35/634* (2013.01); *C04B 35/64* (2013.01); *G04B 37/225* (2013.01); *C04B 2235/3206* (2013.01); *C04B 2235/3208* (2013.01); *C04B 2235/3217* (2013.01); *C04B 2235/3225* (2013.01); *C04B 2235/3239* (2013.01); *C04B 2235/3241* (2013.01); *C04B 2235/3246* (2013.01); *C04B 2235/3267* (2013.01); *C04B 2235/3272* (2013.01); *C04B 2235/3418* (2013.01); *C04B 2235/5436* (2013.01); *C04B 2235/5445* (2013.01); *C04B 2235/6022* (2013.01); *C04B 2235/6562* (2013.01); *C04B 2235/6567* (2013.01); *C04B 2235/9661* (2013.01)

(58) Field of Classification Search
CPC . C04B 35/48–35/481; C04B 35/62695; C04B 35/64; C04B 2235/2306; C04B 2235/3208; C04B 2235/3217; C04B 2235/3225; C04B 2235/3239; C04B 2235/2341; C04B 2235/3267; C04B 2235/327–2235/3272; C04B 2235/3418
See application file for complete search history.

(56) References Cited

U.S. PATENT DOCUMENTS

| 6,200,916 B1 * | 3/2001 | Michel ................. C04B 35/486 501/103 |
| 2007/0182042 A1 | 8/2007 | Ikushima et al. |
| 2007/0292597 A1 | 12/2007 | Ritzberger et al. |
| 2011/0319254 A1 | 12/2011 | Ritzberger et al. |
| 2013/0217562 A1 | 8/2013 | Yamauchi et al. |
| 2013/0284065 A1 | 10/2013 | Nahas |

FOREIGN PATENT DOCUMENTS

| CN | 102659401 | | 9/2012 | |
| EP | 0 700 880 A2 | | 3/1996 | |
| EP | 1 818 318 A2 | | 8/2007 | |
| EP | 1 859 757 A2 | | 11/2007 | |
| EP | 2266934 A1 | * | 12/2010 | ........... C04B 35/486 |
| EP | 2 639 210 A1 | | 9/2013 | |
| JP | 62-128967 | | 6/1987 | |
| JP | 01-157462 | | 6/1989 | |
| JP | 08-310860 | | 11/1996 | |
| JP | 2618621 B2 | * | 6/1997 | |
| WO | WO 2012/085875 A2 | | 6/2012 | |

OTHER PUBLICATIONS

JP 2618621 B2 (Gendoshi) Nov. 6, 1997 (English language machine translation). [online] [retrieved Dec. 20, 2017]. Retrieved from: Japan Patent Office Advanced Industrial Property Network. (Year: 1997).*
European Search Report dated Mar. 26, 2015 in European Application 14189958.3, filed on Oct. 22, 2014 (with English translation).

* cited by examiner

Primary Examiner — Erin Snelting
(74) Attorney, Agent, or Firm — Oblon, McClelland, Maier & Neustadt, L.L.P.

(57) ABSTRACT

A process for the production of a grey zirconia-based article wherein a first mixture includes a zirconia powder forming the base constituent, 4% to 15% by weight of at least one stabilizer selected from among the group of oxides including yttrium oxide, magnesium oxide and calcium oxide alone or in combination, 0.1% to 1% by weight of a vanadium oxide powder ($V_2O_5$), 0.1% to 1% by weight of a chromium oxide powder ($Cr_2O_3$) and 0.1% to 1% by weight of a silicon oxide powder ($SiO_2$); making a second mixture including the first mixture and a binder; making a granulated mixture by conducting a granulation of the second mixture; forming a blank by giving this second granulated mixture the shape of the desired article; sintering the blank in air for at least thirty minutes at a temperature in the range of between 1250° and 1550° C.

11 Claims, No Drawings

PROCESS FOR THE PRODUCTION OF A ZIRCONIA-BASED, COLOURED, IN PARTICULAR GREY, ARTICLE AND A ZIRCONIA-BASED COLOURED DECORATIVE ARTICLE OBTAINED USING THIS PROCESS

This application claims priority from European Patent Application No. 14189958.3 filed on Oct. 22, 2014, the entire disclosure of which is hereby incorporated herein by reference.

The invention relates to a process for the production of a zirconia-based coloured article, in particular of such an article having a colour within the grey range and made by sintering. Such an article will be referred to in the following description as "grey article" for convenience.

The invention also relates to a grey zirconia-based decorative article in particular obtained by the above process.

It is already known from document CN 102659401 to make articles from grey ceramic materials by thermal treatment of a zirconia material in a graphite vacuum furnace, which produces a black/grey surface oxidation of the article. This process has the disadvantage in particular of not solidly colouring the article so that it prevents any subsequent machining of the article after treatment to give it its final shape. Moreover, the surface colour obtained is not uniform and has undesirable streaks and marbling.

Therefore, the main object of the invention is to provide a process for the production of a grey article based on sintered, coloured zirconia and also provide such an article in particular obtained using this process, this article having mechanical properties that are comparable to those of uncoloured zirconia while also having a solid coloration.

Hence, the invention relates to a process for the production of a grey zirconia-based article characterised in that it comprises the following successive steps:
a) making a first mixture comprising:
  a zirconia powder forming the base constituent,
  4% to 15% by weight of at least one stabiliser selected from among the group of oxides comprising yttrium oxide, magnesium oxide and calcium oxide alone or in combination,
  0.1% to 1% by weight of a vanadium oxide powder ($V_2O_5$),
  0.1% to 1% by weight of a silicon oxide powder ($SiO_2$) and
  0.1% to 1% by weight of a chromium oxide powder ($Cr_2O_3$);
b) making a second mixture comprising said first mixture and a binder;
c) making a granulated mixture by conducting a granulation of said second mixture;
d) forming a blank by giving this second granulated mixture the shape of the desired article;
e) sintering said blank in air for at least thirty minutes at a temperature in the range of between 1250° and 1550° C.

By incorporating a mixture of vanadium oxide, chromium oxide and silicon oxide powders into a stabilised zirconia powder the process of the invention enables a solidly coloured ceramic article that has a uniform colour in the grey range to be formed after shaping and sintering. The process of the invention enables grey ceramic articles to be formed that have a particularly attractive aesthetic appearance without otherwise impairing the inherent mechanical properties of uncoloured zirconia.

According to an embodiment of the invention the first mixture comprises:
  0.4% to 0.7% by weight of a vanadium oxide powder ($V_2O_5$),
  0.2% to 0.3% by weight of a chromium oxide powder ($Cr_2O_3$),
  0.2% to 0.3% by weight of a silicon oxide powder ($SiO_2$).

Advantageously, the first mixture additionally comprises between 0.1% and 1% and preferably between 0.2% and 0.3% by weight of a manganese oxide powder ($MnO_2$). In a variant the first mixture additionally comprises 0.1% to 1% by weight of an iron oxide powder ($Fe_2O_3$) and preferably the first mixture additionally comprises 0.1% to 5% by weight of an aluminium oxide powder ($Al_2O_3$).

The invention also relates to an injection moulding or compression moulding composition, commonly referred to by the English term feedstock, intended for the production of a decorative and/or functional article comprising 75% to 96% by weight of a mixture of inorganic powders and 4% to 25% by weight of a binder, wherein said mixture of powders comprises:
  82% to 95.7% by weight of a zirconia powder,
  4% to 15% by weight of at least one stabiliser selected from among the group of oxides comprising yttrium oxide, magnesium oxide and calcium oxide alone or in combination,
  0.1% to 1% by weight of a vanadium oxide powder ($V_2O_5$),
  0.1% to 1% by weight of a chromium oxide powder ($Cr_2O_3$) and
  0.1% to 1% by weight of a silicon oxide powder ($SiO_2$).

According to a preferred embodiment the binder and the mixture of inorganic powders are present in the form of granules that are suitable for use as feedstock for injection into a mould or in the form of powders ready to be pressed into a mould. Advantageously, the mixture of inorganic powders additionally comprises between 0.1% and 1% and preferably between 0.2% and 0.3% by weight of a manganese oxide powder ($MnO_2$). It is further preferred if the mixture of inorganic powders additionally comprises 0.1% to 5% by weight of an aluminium oxide powder ($Al_2O_3$). According to a variant the mixture of inorganic powders additionally comprises 0.1% to 1% by weight of an iron oxide powder ($Fe_2O_3$).

The invention also relates to a grey zirconia-based decorative and/or functional article characterised in that it is formed from a part sintered from a moulded part essentially comprising a matrix of zirconium oxide, 4% to 15% by weight of at least one stabiliser selected from among the group of oxides comprising yttrium oxide, magnesium oxide and calcium oxide and mixtures thereof, 0.1% to 1% by weight of vanadium oxide ($V_2O_5$), 0.1% to 1% by weight of chromium oxide ($Cr_2O_3$) and 0.1% to 1% by weight of silicon oxide ($SiO_2$).

Such articles have the advantage of exhibiting a high gloss after polishing and are therefore suitable for making decorative articles such as component elements for watch cases, jewellery, bracelets, brooches, tie pins, necklaces, handbags, telephones, furniture or household utensils.

According to an advantageous embodiment the article comprises 0.4% to 0.7% by weight of vanadium oxide ($V_2O_5$), 0.2% to 0.3% by weight of chromium oxide ($Cr_2O_3$) and 0.2% to 0.3% by weight of silicon oxide ($SiO_2$).

In a first variant the article additionally comprises between 0.1% and 1% and preferably between 0.2% and 0.3% by weight of manganese oxide ($MnO_2$), 0.1% to 5% by weight of aluminium oxide ($Al_2O_3$) and 0.1% to 1% by weight of iron oxide ($Fe_2O_3$).

Other features and advantages of the invention shall become evident in light of the following description explaining non-restrictive practical examples of the invention given solely for illustration purposes.

A first example of the production process of the invention that will now be described in detail enables the formation of a grey sintered zirconia-based article, the appearance and mechanical properties of which are particularly well suited to the formation of component parts of wristwatches or to the formation of any other decorative and/or functional article.

The grey zirconia article obtained in accordance with this first example comprises 98.8% by weight of stabilised zirconia and the remainder in weight of 0.5% by weight of a vanadium oxide powder ($V_2O_5$), 0.2% by weight of a silicon oxide powder ($SiO_2$) and 0.5% by weight of a chromium oxide powder ($Cr_2O_3$).

The zirconia is stabilised in the tetragonal phase in the classic manner by at least one stabiliser selected from among the group of oxides comprising yttrium oxide, magnesium oxide and calcium oxide alone or in combination, this stabiliser amounting in quantity to 5% by weight in relation to the zirconia.

To form this article the procedure using this practical example of the process of the invention is as follows:

2470 grams of zirconia powder stabilised with 5% by weight of yttrium oxide are weighed. The powder used has an average grain size in the micrometer or submicrometer range of typically 0.5 micrometers. Such a powder is sold under the reference TZ-3Y by the Tosoh Corporation, Japan.

30 grams of a mixture of silicon oxide, vanadium oxide and chromium oxide powder are then weighed.

The silicon powder used has a grain size of 2 microns APS and is sold under the reference No. 13024 by Alfa Aesar, Germany. The vanadium oxide powder used has an average grain size on the micrometer or submicrometer scale of typically 22 mesh and is sold under the reference No. 10904 by Alfa Aesar, Germany.

The chromium oxide powder used has an average grain size on the micrometer or submicrometer scale of typically 2.4 micrometers and is sold under the reference No. 374725 by Sigma Aldrich Chemie, Switzerland. If necessary, the powder is ground to obtain the desired grain size.

It will be noted that all these powders must preferably have a purity of above 95%.

Once weighing of the powders has been concluded, all these powders are mixed and blended in a wet medium. About 50 grams of a binder, e.g. a polyvinyl alcohol, are added in the final blending phase.

The mixture is then dried, e.g. in a classic atomiser.

The granulate obtained is screened to retain particles that have a grain size of less than 200 micrometers.

The screened granulate is then pressed into a mould that has the configuration of the desired article in order to form a blank of the latter.

In its almost final general form the article is placed in a sintering furnace. It will be noted in this regard that the sintering can be conducted in air. The article is then heated in a first phase at a rate of 30 degrees per hour to about 1000° C., then in a second phase at a rate of 50 degrees per hour to a temperature of 1450° C. The article is kept at this temperature for at least thirty minutes and preferably for one hour.

It will be noted that the sintering can, of course, be conducted at any other temperature higher than or equal to 1100° and lower than 1600° C.

The colour of the article obtained after the sintering operation is a pure grey.

The article is then cooled, then machined to obtain a shape suitable for its final use. It will be noted that the colouration achieved is a solid colouration such that a machining operation on the article does not impair its colour in any way.

The article is then polished, e.g. using a diamond paste, and the article thus obtained has a light grey glossy appearance, so that it exhibits attractive and interesting aesthetic characteristics, in particular for applications in the watchmaking domain.

According to another embodiment of the process of the invention the mode of operation described above was followed to make circular watch bezels 45 mm in diameter and 4 mm thick. In this example a combination of $V_2O_5$ (0.63%), $Cr_2O_3$ (0.25%), $SiO_2$ (0.25%), $MnO_2$ (0.25%) and $Al_2O_3$ (0.25%) was used to form a compound, of which the proportion by weight of the total composition is 1.63%, and the balance is 98.37% by weight of stabilised $ZrO_2$. Once configured in their desired final form, the bezels and watch cases were sintered in air for 2 hours at 1450° C. The bezels and watch cases were cooled and then mirror polished. The bezels and watch cases obtained had a dark grey glossy appearance. The colouration was also found to be solid after breakage of a case.

According to a still further embodiment of the process of the invention the mode of operation described above was followed to make circular watch bezels 45 mm in diameter and 4 mm thick. In this example a combination of $V_2O_5$ (0.75%), $Cr_2O_3$ (0.5%), $SiO_2$ (0.30%), $MnO_2$ (0.10%), $Al_2O_3$ (0.25%) and $Fe_2O_3$ (0.25%) was used to form a compound, of which the proportion by weight of the total composition is 2.15%, and the balance is 97.85% by weight of stabilised $ZrO_2$. Once configured in their desired final form, the bezels were sintered in air for 2 hours at 1450° C. The bezels were cooled and then mirror polished. The bezels obtained had a slightly brownish grey glossy appearance. The colouration was also found to be solid after breakage of a bezel.

The following table shows other examples of articles made in accordance with the invention with the colours obtained according to their composition.

| % constituents | EXAMPLES | | | | | | | | | | |
|---|---|---|---|---|---|---|---|---|---|---|---|
| | 1 | 2 | 3 | 4 | 5 | 6 | 7 | 8 | 9 | 10 | 11 |
| stabilised $ZrO_2$ | 95.10 | 95.60 | 96.30 | 97.10 | 97.85 | 97.95 | 97.95 | 98.13 | 98.38 | 98.55 | 98.8 |
| $V_2O_5$ | 1.00 | 1.00 | 0.50 | 1.00 | 1.00 | 0.75 | 0.75 | 0.63 | 0.63 | 0.50 | 0.50 |
| $Cr_2O_3$ | 0.50 | 0.50 | 0.50 | 0.50 | 0.50 | 0.50 | 0.50 | 0.25 | 0.25 | 0.25 | 0.50 |
| $SiO_2$ | 0.40 | 0.40 | 0.20 | 0.40 | 0.40 | 0.30 | 0.30 | 0.25 | 0.25 | 0.20 | 0.20 |
| $MnO_2$ | 0.50 | | | | | | | 0.50 | 0.25 | 0.25 | |
| $Al_2O_3$ | 2.50 | 2.50 | 2.50 | 1.00 | 0.25 | 0.25 | 0.25 | | 0.25 | 0.25 | |

-continued

| % constituents | EXAMPLES | | | | | | | | | | |
|---|---|---|---|---|---|---|---|---|---|---|---|
| | 1 | 2 | 3 | 4 | 5 | 6 | 7 | 8 | 9 | 10 | 11 |
| $Fe_2O_3$ | | | | | | 0.25 | 0.25 | 0.25 | | | |
| Colour | Pinkish grey | Grey bordering on green | Battleship grey | Pure grey | Dark grey | Pure grey | Dark grey | Light grey | Pure dark grey | Light grey | Grey bordering on green |

What is claimed is:

1. A process for producing a zirconia-based article, the method comprising:
   a) making a first mixture comprising:
      a zirconia powder as a base constituent,
      4% to 15% by weight of at least one stabiliser selected from the group consisting of yttrium oxide, magnesium oxide, and calcium oxide,
      0.1% to 1% by weight of a vanadium oxide powder ($V_2O_5$),
      0.1% to 1% by weight of a chromium oxide powder ($Cr_2O_3$), and
      0.1% to 1% by weight of a silicon oxide powder ($SiO_2$);
   b) making a second mixture comprising said first mixture and a binder;
   c) making a granulated mixture by conducting a granulation of said second mixture;
   d) forming a blank by giving the granulated mixture a desired shape of the article; and
   e) sintering said blank in air for at least thirty minutes at a temperature ranging from 1250° to 1550° C. to obtain a grey zirconia-based article.

2. The process according to claim 1, wherein the first mixture comprises:
   0.4% to 0.7% by weight of the vanadium oxide powder ($V_2O_5$),
   0.2% to 0.3% by weight of the chromium oxide powder ($Cr_2O_3$), and
   0.2% to 0.3% by weight of the silicon oxide powder ($SiO_2$).

3. The process according to claim 1, wherein the first mixture further comprises: 0.1% to 1% by weight of a manganese oxide powder ($MnO_2$).

4. The process according to claim 1, wherein the first mixture further comprises: 0.1% to 5% by weight of an aluminium oxide powder ($Al_2O_3$).

5. The process according to claim 1, wherein the first mixture further comprises: 0.1% to 1% by weight of an iron oxide powder ($Fe_2O_3$).

6. The process according to claim 1, wherein the stabiliser is yttrium oxide.

7. The process according to claim 1, further comprising:
   polishing the article after said sintering e) to obtain a polished grey zirconia-based article.

8. The process according to claim 1, wherein the binder is a polyvinyl alcohol.

9. The process according to claim 1, wherein said making c) is performed by subjecting the second mixture to a screening to obtain particles that have a grain size of less than 200 µm.

10. The process according to claim 1, wherein the obtained zirconia-based article is in a solid grey color.

11. The process according to claim 1, wherein the first mixture further comprises: 0.2% to 0.3% by weight of a manganese oxide powder ($MnO_2$).

* * * * *